US010868791B2

(12) United States Patent
Zhang

(10) Patent No.: US 10,868,791 B2
(45) Date of Patent: Dec. 15, 2020

(54) PACKET FORWARDING APPLIED TO VXLAN

(71) Applicant: NEW H3C TECHNOLOGIES CO., LTD., Hangzhou (CN)

(72) Inventor: Dimin Zhang, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 15/770,545

(22) PCT Filed: Oct. 25, 2016

(86) PCT No.: PCT/CN2016/103152

§ 371 (c)(1),
(2) Date: Apr. 24, 2018

(87) PCT Pub. No.: WO2017/071547

PCT Pub. Date: May 4, 2017

(65) Prior Publication Data

US 2019/0068543 A1 Feb. 28, 2019

(30) Foreign Application Priority Data

Oct. 26, 2015 (CN) .......................... 2015 1 0701615

(51) Int. Cl.
*H04L 29/12* (2006.01)
*H04L 29/06* (2006.01)
*H04L 12/46* (2006.01)
*H04L 12/939* (2013.01)

(52) U.S. Cl.
CPC ........ *H04L 61/103* (2013.01); *H04L 12/4633* (2013.01); *H04L 29/06* (2013.01); *H04L 49/552* (2013.01); *H04L 2212/00* (2013.01)

(58) Field of Classification Search
CPC . H04L 61/103; H04L 12/4633; H04L 49/552; H04L 29/06; H04L 2212/00
See application file for complete search history.

(56) References Cited

U.S. PATENT DOCUMENTS 7,830,787 B1 11/2010 Wijnands et al.
2002/0194367 A1* 12/2002 Nakamura .......... H04L 12/2856 709/238

(Continued)

FOREIGN PATENT DOCUMENTS

CN 101184017 A 5/2008
CN 101917439 A 12/2010

(Continued)

OTHER PUBLICATIONS

Mahalingam et al., "Virtual eXtensible Local Area Network (VXLAN): A Framework for Overlaying Virtualized Layer 2 Networks over Layer 3 Networks'" (RFC7348) IPCOM000238444D Aug. 1, 2014 (Year: 2014).*

(Continued)

*Primary Examiner* — Thinh D Tran
(74) *Attorney, Agent, or Firm* — McCoy Russell LLP

(57) ABSTRACT

Examples of the present disclosure provide a packet forwarding method and apparatus applied to a VXLAN. In examples of the present disclosure, redundancy protection for a VXLAN IP gateway is realized by deploying a VXLAN IP gateway group in a VXLAN, and a first VTEP in the VXLAN can ensure each VXLAN IP gateway in the VXLAN IP gateway group to learn an ARP entry of a same VM by establishing a VXLAN control tunnel from the first VTEP to each VXLAN IP gateway of the VXLAN IP gateway group and establishing a VXLAN data tunnel from the first VTEP to the VXLAN IP gateway group, thus ensuring the VXLAN IP gateway correctly forwards the service packet.

8 Claims, 7 Drawing Sheets

(56) References Cited

U.S. PATENT DOCUMENTS

| | | | | |
|---|---|---|---|---|
| 2013/0318219 | A1* | 11/2013 | Kancherla | H04L 49/70 709/222 |
| 2015/0281067 | A1* | 10/2015 | Wu | H04L 61/103 370/392 |
| 2016/0113006 | A1* | 4/2016 | Murphy | H04W 24/04 370/338 |

FOREIGN PATENT DOCUMENTS

| | | | |
|---|---|---|---|
| CN | 104115453 | A | 10/2014 |
| CN | 104272668 | A | 1/2015 |

OTHER PUBLICATIONS

ISA State Intellectual Property Office of the People's Republic of China, International Search Report Issued in Application No. PCT/CN2016/103152, dated Feb. 6, 2017, WIPO, 4 pages.

ISA State Intellectual Property Office of the People's Republic of China, Written Opinion of the International Searching Authority Issued in Application No. PCT/CN2016/103152, dated Feb. 6, 2017, WIPO, 5 pages.

Japanese Patent Office, Office Action Issued in Application No. 2018-521516, dated Feb. 26, 2019, 4 pages. (Submitted with Machine Translation).

State Intellectual Property Office of the People's Republic of China, Office Action and Search Report Issued in Application No. 201510701615.1, dated Mar. 4, 2019, 13 pages. (Submitted with Partial Translation).

European Patent Office, Extended European Search Report Issued in Application No. 16858982.8, dated Nov. 8, 2018, Germany, 14 pages.

* cited by examiner

PACKET FORWARDING APPLIED TO VXLAN

CROSS-REFERENCE TO RELATED APPLICATIONS

The present application is a U.S. National Phase of International Patent Application Serial No. PCT/CN2016/103152 entitled "PACKET FORWARDING APPLIED TO VXLAN," filed on Oct. 25, 2016. International Patent Application Serial No. PCT/CN2016/103152 claims priority to Chinese Patent Application No. 201510701615.1, filed on Oct. 26, 2015. The entire contents of each of the above-cited applications are hereby incorporated by reference in their entirety for all purposes.

BACKGROUND

Virtual extensible LAN (VXLAN) provides layer-2 connections for separated physical sites based on existing service provider or enterprise IP networks, and is able to segregate services of different tenants. As a key technique for network virtualization, VXLAN is more and more applied in large scale data center networks in combination with software defined network (SDN).

VXLAN is identified by a VXLAN identifier (ID). The VXLAN ID is also referred to as a VXLAN network identifier (VNI), having a length of 24 bits.

DETAILED DESCRIPTION

The preset disclosure will be described in further detail hereinafter with reference to accompanying drawings and examples to make the technical solution and merits therein clearer.

In VXLAN, a large amount of services is forwarded via VXLAN IP gateways. Therefore, redundancy backup protection of the VXLAN IP gateways becomes very important.

Figure 1:
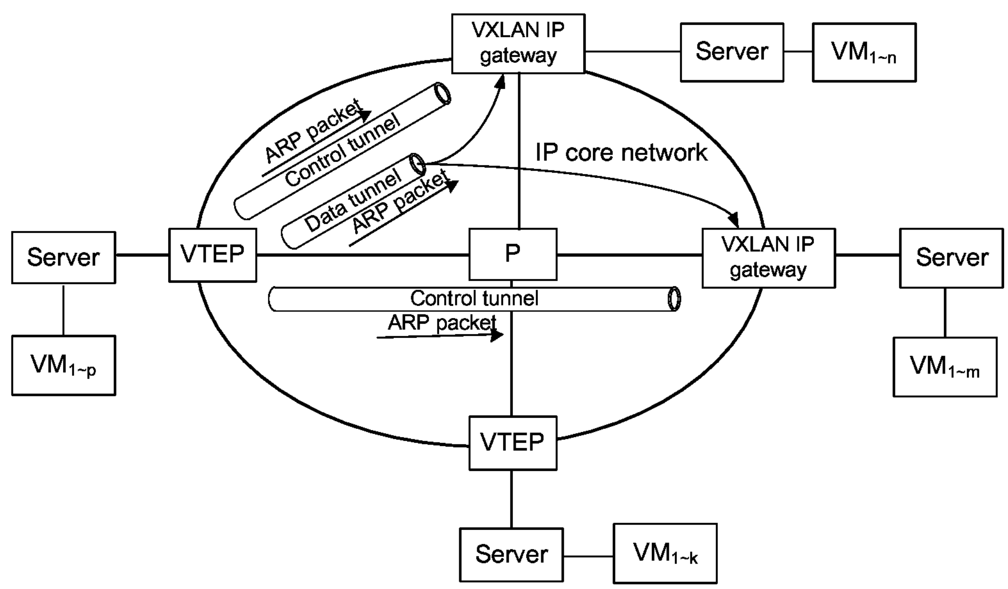
FIG. 1 is a schematic diagram illustrating a structure of a VXLAN according to various examples of the present disclosure.

FIG. 1 is a schematic diagram illustrating a network structure of a VXLAN according to various examples of the present disclosure.

In some embodiments of the present disclosure, a plurality of VTEPs are configured in the VXLAN as VXLAN IP gateways. Each VTEP except for the VXLAN IP gateways in the VXLAN establishes a VXLAN control tunnel from the present VTEP to respective VXLAN IP gateway in a VXLAN IP gateway group, and establishes a VXLAN data tunnel from the present VTEP to the VXLAN IP gateway group, and transmits ARP packets respectively via the VXLAN data tunnel and the VXLAN control tunnel, such that each VXLAN IP gateway learns an ARP entry matching the same host, i.e., each VXLAN IP gateway are backups for each other, which realizes redundancy protection of the VXLAN IP gateway devices, and ensures that each VXLAN IP gateway correctly forwards service packets based on the ARP entry. The method provided by various examples of the present disclosure is able to implement redundancy protection for the VXLAN IP gateways in the VXLAN, and improves network robustness and fault-tolerant ability.

Hereinafter, the method provided by various examples of the present disclosure is described.

Figure 2:
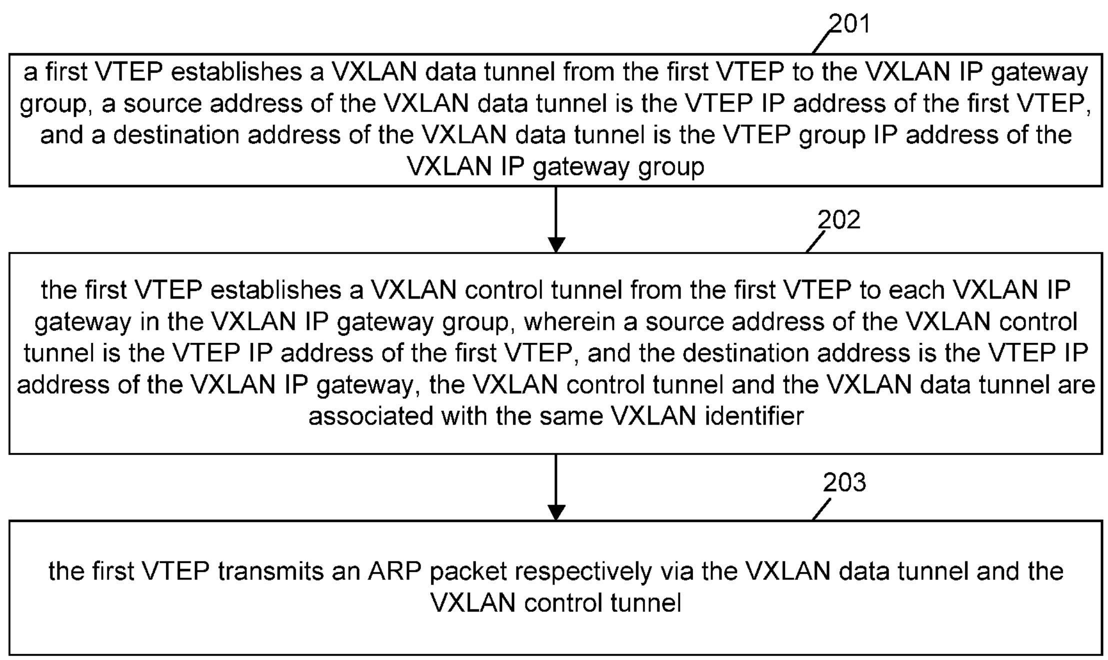
FIG. 2 is a flowchart illustrating a method according to various examples of the present disclosure.

FIG. 2 is a flowchart illustrating a method provided by various examples of the present disclosure. As shown in FIG. 2, in the method provided by various examples of the present disclosure, N VTEPs are configured in the VXLAN as VXLAN IP gateways, wherein $N>1$. The N VTEPs acting as the VXLAN IP gateways form a VXLAN IP gateway group. In the VXLAN, except for the VTEPs acting as the VXLAN IP gateways, there are VTEPs not acting as the VXLAN IP gateways. For facilitating the description, the VTEPs not acting as the VXLAN IP gateways are referred to as first VTEPs, and the VTEPs acting as the VXLAN IP gateways are referred to as second VTEPs.

In some examples of the present disclosure, the VXLAN IP gateway group may be regarded as one device for respective first VTEP. In some examples of the present disclosure, a VTEP group IP address is configured for the VXLAN IP gateway group, and each VXLAN IP gateway in the VXLAN IP gateway group is also configured with a VTEP IP address, wherein different VXLAN IP gateways in the VXLAN IP gateway group are configured with different VTEP IP addresses. It should be noted that, the VTEP group IP address configured for the VXLAN IP gateway group and the different VTEP IP addresses configured for different VXLAN IP gateways in the VXLAN IP gateway group are not gateway IP addresses. The VTEP group IP address configured for the VXLAN IP gateway group is used for identifying the VXLAN IP gateway, and the different VTEP IP addresses configured for the VXLAN IP gateways are used for identifying the VXLAN IP gateways, there are irrelevant to the gateway IP address.

In some examples of the present disclosure, besides the VTEP IP address configured for respective VXLAN IP gateway in the VXLAN IP gateway group, a gateway IP address and a virtual MAC address are additionally configured. In order to be transparent to the VM, the gateway IP address and the virtual MAC address configured for respective VXLAN IP gateway are the same.

As shown in FIG. 2, the method may include the following.

In block 201, a first VTEP establishes a VXLAN data tunnel from the first VTEP to the VXLAN IP gateway group, a source address of the VXLAN data tunnel is the VTEP IP address of the first VTEP, and a destination address of the VXLAN data tunnel is the VTEP group IP address of the VXLAN IP gateway group.

In one example of the present disclosure, the VTEP group IP address of the VXLAN IP gateway group may be configured on a loop back port of the VXLAN IP gateway of the VXLAN IP gateway group, and is distributed to the network via a routing protocol. Thus, based on the distribution of the VXLAN IP gateway, the first VTEP is able to obtain the VTEP group IP address of the VXLAN IP gateway group, and then establishes the VXLAN data tunnel from the present VTEP to the VXLAN IP gateway group according to the obtained VTEP group IP address.

In some examples of the present disclosure, the VXLAN data tunnel established by the first VTEP to the VXLAN IP gateway group is associated with N tunnel ports. N is as defined in the above, i.e., the number of VXLAN IP gateways in the VXLAN IP gateway group. The N tunnel ports respectively points to N VXLAN IP gateways. Therefore, when transmitting VXLAN service via the VXLAN data tunnel subsequently, the first VTEP selects one tunnel port from the N tunnel ports to transmit the VXLAN service. There may be various manners to select the tunnel port, e.g., load sharing between equal-cost paths. The first VTEP selects a tunnel port to transmit the VXLAN service according to the equal-cost path load sharing manner, which ensures that loads between VXLAN IP gateways in the VXLAN IP gateway group are balanced.

In block 202, the first VTEP establishes a VXLAN control tunnel from the first VTEP to each VXLAN IP gateway in the VXLAN IP gateway group, wherein a source address of the VXLAN control tunnel is the VTEP IP address of the first VTEP, and the destination address is the VTEP IP address of the VXLAN IP gateway, the VXLAN control tunnel and the VXLAN data tunnel are associated with the same VXLAN identifier.

Herein, the VXLAN control tunnel is not responsible for forwarding data packets, but is responsible for forwarding protocol control packets, e.g., ARP packets.

In some examples of the present disclosure, the first VTEP establishes the VXLAN control tunnel from the first VTEP to each VXLAN IP gateway of the VXLAN IP gateway group, so as to transmit ARP packets via the established VXLAN control tunnel during subsequent ARP entry learning procedure, therefore each VXLAN IP gateway in the VXLAN IP gateway group learns the ARP entry of the host, and the following problems may avoided: ARP packets of some hosts cannot be received by each VXLAN IP gateway, e.g. the ARP packet transmitted by a VM of the tenant cannot be received by each VXLAN IP gateway, which may result in that the gateway cannot learn the ARP entry of the VM, therefore the VXLAN IP gateway cannot forward the VXLAN service packet.

It should be noted that, in some examples of the present disclosure, block 201 and block 202 have no strict execution order. For example, in some examples, block 202 may be executed before block 201. Or, blocks 201 and 202 may be executed at the same time. This is not restricted in the present disclosure.

In block 203, the first VTEP transmits an ARP packet respectively via the VXLAN data tunnel and the VXLAN control tunnel.

As described above, the first VTEP has N tunnel ports associated with the VXLAN data tunnel. In one example, the first VTEP transmitting the ARP packet via the VXLAN data tunnel in block 203 may include the following processes a1 and a2.

In process a1, the first VTEP performs a VXLAN encapsulation to the ARP packet according to the VXLAN data tunnel.

The VXLAN encapsulation mainly includes a UDP header, a VXLAN header, an IP header, etc. The VXLAN header includes at least a VNI. In process a1, the VNI is associated with the VXLAN data tunnel. The IP header includes at least an outer source IP address, an outer destination IP address. In process a1, the outer source IP address is the source address of the VXLAN data tunnel, i.e., the VTEP IP address of the first VTEP. The outer destination IP address is the destination address of the VXLAN data tunnel, i.e., the VTEP group IP address of the VXLAN IP gateway group.

In process a2, the first VTEP selects one tunnel port from the N tunnel ports associated with the VXLAN data tunnel, and forwards the ARP packet after the VXLAN encapsulation via the selected tunnel port.

In one example of the present disclosure, there may be various manners to select one tunnel port from the N tunnel ports on the first VTEP associated with the VXLAN data tunnel. For example, a hash calculation may be performed to the host information of the ARP packet, e.g., source IP address and the source MAC address, and a tunnel port may be selected from the N tunnel ports on the first VTEP associated with the VXLAN data tunnel according to the calculated hash value.

In one example, the first VTEP transmitting the ARP packet via the VXLAN control tunnel in block 203 may include the following processes b1 and b2.

In process b1, the first VTEP performs a VXLAN encapsulation to the ARP packet according to the VXLAN control tunnel.

As described above, the VXLAN encapsulation mainly includes a UDP header, a VXLAN header, an IP header, etc. The VXLAN header includes at least a VNI. In process b1, the VNI is associated with the VXLAN control tunnel. The IP header includes at least an outer source IP address, an outer destination IP address, etc. In process b1, the outer source IP address is the source address of the VXLAN control tunnel, i.e., the IP address of the first VTEP. The outer destination IP address is the destination address of the VXLAN control tunnel, i.e., the VTEP IP address of the VXLAN IP gateway.

In process b2, the first VTEP forwards the ARP packet after the VXLAN encapsulation via the tunnel port on the first VTEP connected with the VXLAN control tunnel.

Now, the process that the first VTEP transmits the ARP packet via the VXLAN control tunnel is realized through b1 and b2.

It should be noted that, in some examples of the present disclosure, the VXLAN control tunnel and the VXLAN data tunnel are two different types of tunnels. Therefore, the tunnel port of the VXLAN control tunnel and the tunnel port of the VXLAN data tunnel are two different types of ports.

The ARP packet in block 203 may be an ARP request packet or an ARP response packet, which is not restricted in the present disclosure.

Now, the flow as shown in FIG. 2 is finished.

Thereafter, the VXLAN IP gateway is able to receive the ARP packet from the first VTEP, recognizes whether the outer destination IP address in the VXLAN encapsulation of the ARP packet is the IP address of the VXLAN IP gateway; if no, proceeds with ARP entry learning according to the ARP packet; if yes, replace the outer destination IP address by the VTEP group IP address, and proceeds with ARP entry learning according to the modified ARP packet.

Figure 3:
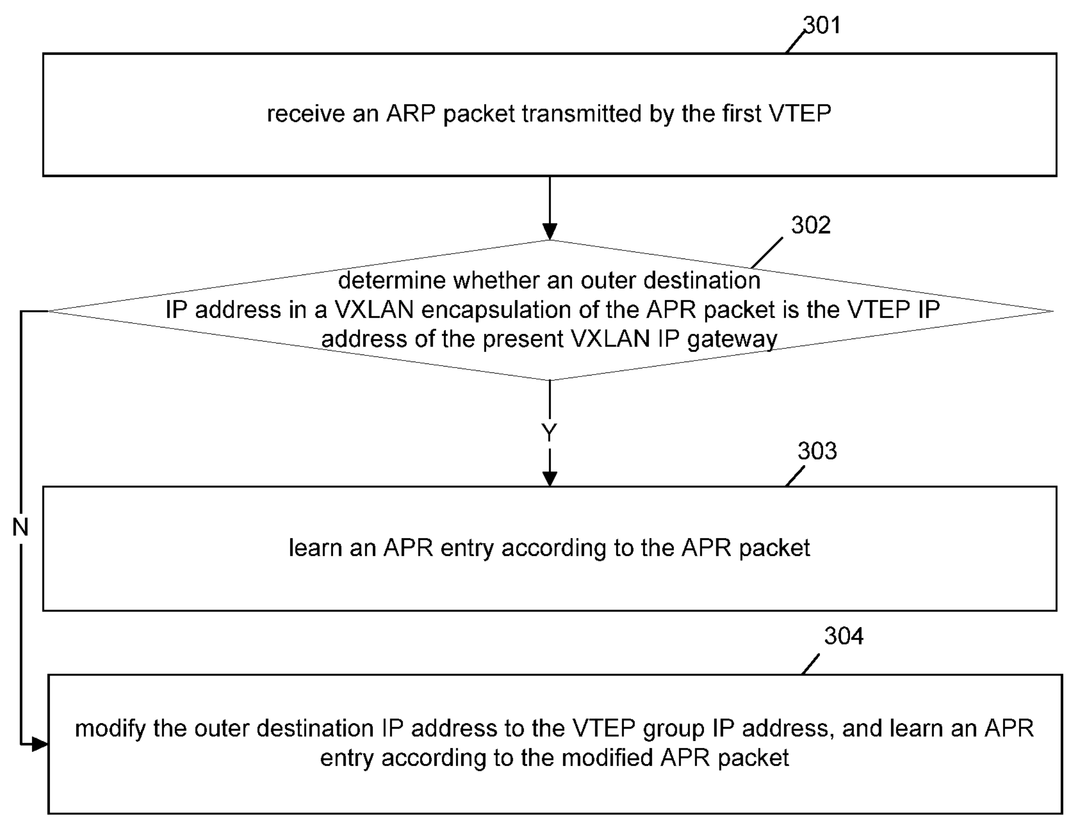
FIG. 3 is a flowchart illustrating another method according to various examples of the present disclosure.

FIG. 3 is a flowchart illustrating another method according to various examples of the present disclosure. As shown in FIG. 3, in the VXLAN, N VXLAN IP gateways form a VXLAN IP gateway group. The VXLAN IP gateway group is configured with a VTEP group IP address. The VXLAN IP gateways in the VXLAN IP gateway group have different IP addresses. The VXLAN IP gateways in the VXLAN are referred to as second VTEPs. The VXLAN further include first VTEPs. This method is applied to the VXLAN IP gateway. The method includes the following.

In block 301, the VXLAN IP gateway receives an ARP packet transmitted by the first VTEP.

In block 302, the VXLAN IP gateway determines whether an outer destination IP address in a VXLAN encapsulation of the ARP packet is the VTEP IP address of the present VXLAN IP gateway, if yes, the method proceeds to block 304; otherwise, the method proceeds to block 303.

In block 303, the VXLAN IP gateway learns an ARP entry according to the ARP packet.

In block 304, the VXLAN IP gateway modifies the outer destination IP address to the VTEP group IP address, and learns an ARP entry according to the modified ARP packet.

It can be seen from block 304 that, in some examples of the present disclosure, when the VXLAN IP gateway finds that the outer destination IP address in the VXLAN encapsulation of the ARP packet received from the first VTEP is the IP address of the present gateway, it means that the ARP packet is transmitted by the first VTEP via the VXLAN control tunnel. Based on this, the VXLAN IP gateway modifies the outer destination IP address to the VTEP group IP address of the VXLAN IP gateway group and then learns ARP entry according to the modified ARP packet. This ensures that the VXLAN IP gateway finally learns the ARP entry corresponding to the ARP packet transmitted by the first VTEP via the VXLAN control tunnel to the VXLAN data tunnel from the VXLAN IP gateway to the first VTEP. The details may be seen in the following description about the ARP entry learning.

It can be seen based on the flow as shown in FIGS. 2 and 3 that, in some examples of the present disclosure, in the VXLAN, a plurality of VTEPs are configured as VXLAN IP gateways, a VTEP except for the VXLAN IP gateways in the VXLAN establishes a VXLAN control tunnel from the present VTEP to each VXLAN IP gateway in the VXLAN IP gateway group, and establishes a VXLAN data tunnel from the present VTEP to the VXLAN IP gateway group, and transmits ARP packet respectively via the VXLAN data tunnel and the VXLAN control tunnel, such that each VXLAN IP gateway learns the same ARP entry, i.e., a backup is implemented between the VXLAN IP gateways in the VXLAN IP gateway group. Thus, redundancy protection of the VXLAN IP gateway devices is realized. In addition, the VXLAN IP gateway is able to learn the ARP entry of the VM of each tenant, which ensures that each VXLAN IP gateway can correctly forward VXLAN service packets.

In some examples of the present disclosure, in order that each VXLAN IP gateway in the VXLAN IP gateway group transmits packet to the first VTEP, each VXLAN IP gateway in the VXLAN IP gateway group further performs the following:

establishing a VXLAN data tunnel from the present gateway to the first VTEP;

wherein a source address of the established VXLAN data tunnel is the VTEP group IP address of the VXLAN IP gateway group, a destination address is the IP address of the first VTEP, VXLAN data tunnels from the present gateway to different first VTEPs have different VXLAN data tunnel identifiers.

After establishing the VXLAN data tunnel from the present gateway to respective first VTEP, each VXLAN IP gateway in the VXLAN IP gateway group is able to realize packet transmission from the present gateway to respective first VTEP via the VXLAN data tunnel established with respective first VTEP, e.g., initiatively transmits ARP request packet to the first VTEP to initiatively learn the ARP entry, or transmits ARP response packet or data packet, etc.

In some examples of the present disclosure, based on the above VXLAN data tunnel established by the VXLAN IP gateway from the VXLAN IP gateway to the first VTEP, in block 303, the VXLAN IP gateway performing the ARP learning according to the ARP packet includes the following:

In process c1, it is determined whether the VXLAN IP gateway stores an ARP entry with the following contents:

a VXLAN identifier in the VXLAN encapsulation, host information in the ARP packet, and an identifier of a VXLAN data tunnel, wherein a source address of the VXLAN data tunnel is the outer destination IP address in the VXLAN encapsulation, and a destination address of the VXLAN data tunnel is the outer source IP address in the VXLAN encapsulation.

In process c2, if it is determined in process c1 that the VXLAN IP gateway does not have such an ARP entry, the ARP entry with the above contents is learnt.

In one example of the present disclosure, if it is determined in process c1 that the VXLAN IP gateway has such an ARP entry, the ARP packet may be ignored in order to avoid creating repeated ARP entry.

Now, the ARP entry learning according to the received ARP packet in block 303 is realized through c1 and c2.

Similarly, in block 304, the learning of the ARP entry according to the modified ARP packet may include d1 and d2.

In process d1, it is determined whether the VXLAN IP gateway stores an ARP entry with the following contents:

a VXLAN identifier in the VXLAN encapsulation, host information in the ARP packet, and an identifier of a VXLAN data tunnel, wherein a source address of the VXLAN data tunnel is the outer destination IP address in the VXLAN encapsulation, and a destination address of the VXLAN data tunnel is the outer source IP address in the VXLAN encapsulation.

In process d2, if it is determined in process d1 that the VXLAN IP gateway does not have such an ARP entry, the ARP entry with the above contents is learnt.

In one example of the present disclosure, if it is determined in process d1 that the VXLAN IP gateway has such an ARP entry, the ARP packet may be ignored in order to avoid creating repeated ARP entry.

Now, the learning of the ARP entry according to the modified ARP packet in block 304 is implemented via the above processes d1 and d2.

It should be noted that, in the above c1 or d1, the host information in the ARP packet mainly refers to the host relevant information carried in the inner encapsulation of the ARP packet, e.g., source IP address, source MAC address, etc.

In some examples of the present disclosure, after the VXLAN IP gateway creates the ARP entry according to the above description, when the VXLAN IP gateway transmits data packet to the first VTEP, the VXLAN IP gateway finds a matching ARP entry for forwarding the data packet from the learnt ARP entries, and forwards the data packet via the VXLAN data tunnel corresponding to the VXLAN data tunnel identifier in the matching ARP entry, so as to realize correct forwarding of the VXLAN service by the VXLAN IP gateway.

The foregoing describes the method provided by various examples of the present disclosure. Hereinafter, the flow as shown in FIGS. 2 and 3 is described with reference to some examples.

Figure 4:
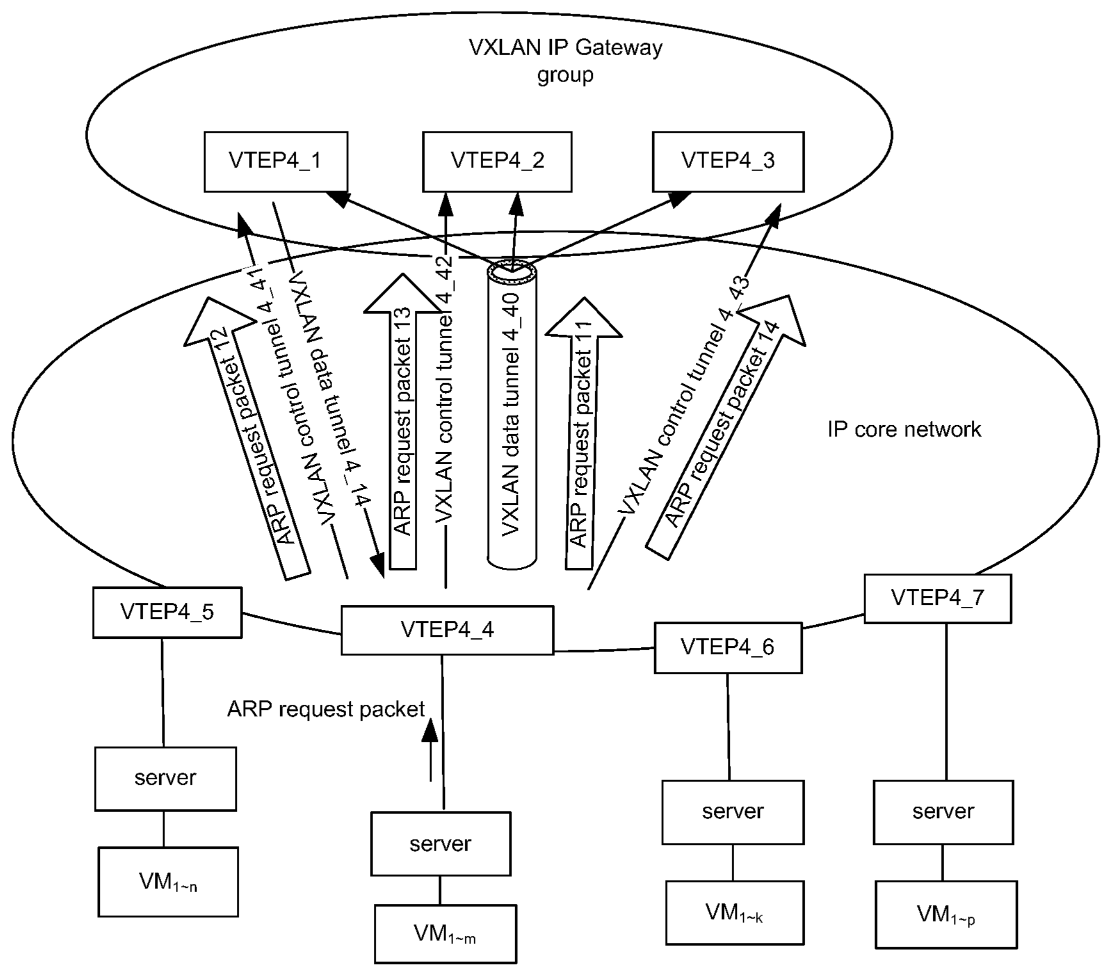
FIG. 4 is a schematic diagram illustrating a network according to various examples of the present disclosure.

FIG. 4 is a schematic diagram illustrating a network structure provided by various examples of the present disclosure. As shown in FIG. 4, VTEP 4_1, VTEP 4_2 and VTEP 4_3 are configured as VXLAN IP gateways. VTEP 4_1, VTEP 4_2 and VTEP 4_3 are referred to as second VTEPs. In FIG. 4, the remaining VTEP 4_4 to VTEP 4_7 are referred to as first VTEPs.

VTEP 4_1, VTEP 4_2 and VTEP 4_3 form a VXLAN IP gateway group. VTEP 4_1, VTEP 4_2 and VTEP 4_3 play the same role in the VXLAN IP gateway group and there is no role election. Therefore, the VXLAN IP gateway group is referred to as a stateless VXLAN IP gateway group. The VXLAN IP gateway group is transparent for the first VTEPs and may be treated as one device.

The VXLAN IP gateway group is configured with a VTEP group IP address (referred to as GroupIP1). VTEP 4_1 to VTEP 4_3 in the VXLAN IP gateway group, i.e. group members of the VXLAN IP gateway group, have different VTEP IP addresses (also referred to as member IP addresses). The member IP address of VTEP 4_1 to VTEP 4_3 are respectively Member IP 4_1, Member IP 4_2 and Member IP 4_3. Table 1 shows the IP address of the VXLAN IP gateway group and the IP addresses of the members of the VXLAN IP gateway group.

TABLE 1

| IP address of the VXLAN IP gateway group | IP addresses of the members of the VXLAN IP gateway group |
|---|---|
| GroupIP1 | Member IP 4_1<br>Member IP 4_2<br>Member IP 4_3 |

In FIG. 4, VTEP 4_4 is taken as an example first VTEP. VTEP 4_4 establishes a VXLAN data tunnel from VTEP 4_4 to the VXLAN IP gateway group, denoted by VXLAN data tunnel 4_40. The VXLAN associated with the VXLAN data tunnel 4_40 is VXLAN A. The source address of the VXLAN data tunnel 4_40 is the VTEP IP address of VTEP 4_4 (denoted by IP 4_4), the destination address is the IP address of the VXLAN IP gateway group GroupIP1. The VTEP 4_4 has three local tunnel ports associated with the VXLAN data tunnel 4_40, respectively denoted by port p41, port p42, port p43 (not shown in FIG. 4), wherein port p41 points to VTEP 4_1, port p42 points to VTEP 4_2, and point p43 points to VTEP 4_3.

In FIG. 4, VTEP 4_4 establishes a VXLAN control tunnel from VTEP 4_4 to VTEP 4_1, denoted by VXLAN control tunnel 4_41, the VXLAN associated with the VXLAN control tunnel 4_41 is VXLAN A. The source address of the VXLAN control tunnel 4_41 is the VTEP IP address IP 4_4 of the VTEP 4_4, the destination address is the member IP address Member IP 4_1 of the VTEP 4_1.

VTEP 4_4 establishes a VXLAN control tunnel from VTEP 4_4 to VTEP 4_2, denoted by VXLAN control tunnel 4_42, the VXLAN associated with the VXLAN control tunnel 4_42 is VXLAN A. The source address of the VXLAN control tunnel 4_42 is the VTEP IP address IP 4_4 of the VTEP 4_4, the destination address is the member IP address Member IP 4_2 of the VTEP 4_2.

VTEP 4_4 establishes a VXLAN control tunnel from VTEP 4_4 to VTEP 4_3, denoted by VXLAN control tunnel 4_43, the VXLAN associated with the VXLAN control tunnel 4_43 is VXLAN A. The source address of the VXLAN control tunnel 4_43 is the VTEP IP address IP 4_4 of the VTEP 4_4, the destination address is the member IP address Member IP 4_3 of the VTEP 4_3.

Table 2 shows the VXLAN data tunnel and VXLAN control tunnels established by VTEP 4_4.

TABLE 2

| VXLAN ID | VXLAN tunnel |
|---|---|
| VXLAN A | VXLAN data tunnel 4_40 (source address is IP 4_4, destination address is GroupIP1), the associated tunnel ports are p41, p42, p43, wherein p41 points to VTEP 4_1, p42 points to VTEP 4_2, p43 points to VTEP 4_3 |
| VXLAN A | VXLAN control tunnel 4_41 (source address is IP 4_4, destination address is Member IP 4_1) |
| VXLAN A | VXLAN control tunnel 4_42 (source address is IP 4_4, destination address is Member IP 4_2) |
| VXLAN A | VXLAN control tunnel 4_43 (source address is IP 4_4, destination address is Member IP 4_3) |

For other first VTEPs in FIG. 4, e.g., VTEP 4_5 to VTEP 4_7, the VXLAN data tunnel and the VXLAN control tunnels may be established similarly as those established by the VTEP 4_4, which is not repeated herein.

In FIG. 4, acting as the VXLAN IP gateway, VTEP 4_1 establishes a VXLAN data tunnel from VTEP 4_1 to VTEP 4_4, denoted by VXLAN data tunnel 4_14. The VXLAN associated with the VXLAN data tunnel 4_14 is VXLAN A. The source address of the VXLAN data tunnel 4_14 is GroupIP1, and the destination address is the IP address IP 4_4 of VTEP 4_4.

VTEP 4_1 establishes a VXLAN data tunnel from VTEP 4_1 to VTEP 4_5, denoted by VXLAN data tunnel 4_15. The VXLAN associated with the VXLAN data tunnel 4_15 is VXLAN A. The source address of the VXLAN data tunnel 4_15 is GroupIP1, and the destination address is the IP address IP 4_5 of VTEP 4_5.

VTEP 4_1 establishes a VXLAN data tunnel from VTEP 4_1 to VTEP 4_6, denoted by VXLAN data tunnel 4_16. The VXLAN associated with the VXLAN data tunnel 4_16 is VXLAN A. The source address of the VXLAN data tunnel 4_16 is GroupIP1, and the destination address is the IP address IP 4_6 of VTEP 4_6.

VTEP 4_1 establishes a VXLAN data tunnel from VTEP 4_1 to VTEP 4_7, denoted by VXLAN data tunnel 4_17. The VXLAN associated with the VXLAN data tunnel 4_17 is VXLAN A. The source address of the VXLAN data tunnel 4_17 is GroupIP1, and the destination address is the IP address IP 4_7 of VTEP 4_7.

Table 3 shows the VXLAN data tunnels established by VTEP 4_1 (not shown in FIG. 4 for simplicity).

TABLE 3

| VXLAN ID | VXLAN tunnel |
|---|---|
| VXLAN A | VXLAN data tunnel 4_14 (source address is GroupIP1, destination address is the IP address IP 4_4 of VTEP 4_4) |
| VXLAN A | VXLAN data tunnel 4_15 (source address is GroupIP1, destination address is the IP address IP 4_5 of VTEP 4_5) |
| VXLAN A | VXLAN data tunnel 4_16 (source address is GroupIP1, destination address is the IP address IP 4_6 of VTEP 4_6) |
| VXLAN A | VXLAN data tunnel 4_17 (source address is GroupIP1, destination address is the IP address IP 4_7 of VTEP 4_7) |

In FIG. 4, acting as the VXLAN IP gateway, VTEP 4_2 establishes VXLAN data tunnels as shown in table 4 according to a manner similar as that of VTEP 4_1.

TABLE 4

| VXLAN ID | VXLAN tunnel |
|---|---|
| VXLAN A | VXLAN data tunnel 4_24 (source address is GroupIP1, destination address is the IP address IP 4_4 of VTEP 4_4) |
| VXLAN A | VXLAN data tunnel 4_25 (source address is GroupIP1, destination address is the IP address IP 4_5 of VTEP 4_5) |
| VXLAN A | VXLAN data tunnel 4_26 (source address is GroupIP1, destination address is the IP address IP 4_6 of VTEP 4_6) |
| VXLAN A | VXLAN data tunnel 4_27 (source address is GroupIP1, destination address s the IP address IP 4_7 of VTEP 4_7) |

In FIG. 4, acting as the VXLAN IP gateway, VTEP 4_3 establishes VXLAN data tunnels as shown in table 5 according to a manner similar as that for establishing the data tunnels by VTEP 4_1.

TABLE 5

| VXLAN ID | VXLAN tunnel |
|---|---|
| VXLAN A | VXLAN data tunnel 4_34 (source address is GroupIP1, destination address is the IP address IP 4_4 of VTEP 4_4) |
| VXLAN A | VXLAN data tunnel 4_35 (source address is GroupIP1, destination address is the IP address IP 4_5 of VTEP 4_5) |
| VXLAN A | VXLAN data tunnel 4_36 (source address is GroupIP1, destination address is the IP address IP 4_6 of VTEP 4_6) |
| VXLAN A | VXLAN data tunnel 4_37 (source address is GroupIP1, destination address is the IP address IP 4_7 of VTEP 4_7) |

Based on the establishment of the VXLAN data tunnels and the VXLAN control tunnels as described above, the packet forwarding based on the VXLAN data tunnels and the VXLAN control tunnels are described hereinafter.

Suppose that VM1 as shown in FIG. 4 broadcasts a free ARP request packet. The source IP address of the ARP packet is the IP address IP1 of VM1, and the source MAC address is the MAC address MAC1 of VM1.

VTEP 4_4 receives the free ARP request packet broadcasted by VM1, finds that there are four local tunnels as shown in Table 2, and generates 4 duplicated ARP request packets, denoted by ARP request packets 01 to 04.

VTEP 4_4 performs a VXLAN encapsulation to the ARP request packet 01 according to VXLAN data tunnel 4_40. The VNI in the VXLAN header of the VXLAN encapsulation is VXLAN A, the outer source IP address in the IP header of the VXLAN encapsulation is the source address IP 4_4 of the VXLAN data tunnel 4_40, the outer destination IP address is the destination address GroupIP1 of the VXLAN data tunnel 4_40. VTEP 4_4 selects one port from the tunnel ports associated with the VXLAN data tunnel 4_40, i.e., ports p41 to p43. Suppose that port p41 is selected. VTEP 4_4 transmits the encapsulated ARP request packet 01 via the port p41. For facilitating the description, the ARP request packet 01 after the VXLAN encapsulation is referred to as ARP request packet 11.

VTEP 4_4 performs a VXLAN encapsulation to the ARP request packet 02 according to VXLAN control tunnel 4_41. The VNI in the VXLAN header of the VXLAN encapsulation is VXLAN A, the outer source IP address in the IP header of the VXLAN encapsulation is the source address IP 4_4 of the VXLAN control tunnel 4_41, the outer destination IP address is the destination address MemberIP 4_1 of the VXLAN control tunnel 4_41. VTEP 4_4 transmits the encapsulated ARP request packet 02 via the VXLAN control tunnel 4_41. For facilitating the description, the ARP request packet 02 after the VXLAN encapsulation is referred to as ARP request packet 12.

VTEP 4_4 performs a VXLAN encapsulation to the ARP request packet 03 according to VXLAN control tunnel 4_42. The VNI in the VXLAN header of the VXLAN encapsulation is VXLAN A, the outer source IP address in the IP header of the VXLAN encapsulation is the source address IP 4_4 of the VXLAN control tunnel 4_42, the outer destination IP address is the destination address Member IP 4_2 of the VXLAN control tunnel 4_42. VTEP 4_4 transmits the encapsulated ARP request packet 03 via the VXLAN control tunnel 4_42. For facilitating the description, the ARP request packet 03 after the VXLAN encapsulation is referred to as ARP request packet 13.

VTEP 4_4 performs a VXLAN encapsulation to the ARP request packet 04 according to VXLAN control tunnel 4_43. The VNI in the VXLAN header of the VXLAN encapsulation is VXLAN A, the outer source IP address in the IP header of the VXLAN encapsulation is the source address IP 4_4 of the VXLAN control tunnel 4_43, the outer destination IP address is the destination address Member IP 4_3 of the VXLAN control tunnel 4_43. VTEP 4_4 transmits the encapsulated ARP request packet 04 via the VXLAN control tunnel 4_43. For facilitating the description, the ARP request packet 04 after the VXLAN encapsulation is referred to as ARP request packet 14.

VTEP 4_1 receives the ARP request packet 11 transmitted by VTEP 4_4, finds that the outer destination IP address in the IP header of the VXLAN encapsulation of the ARP request packet 11 is the IP address GroupIP1 of the VXLAN IP gateway group, then determines whether it has an ARP entry containing the contents as shown in table 6.

TABLE 6

| IP | MAC | VXLAN ID | VXLAN tunnel |
|---|---|---|---|
| IP1 | MAC1 | VXLAN A | VXLAN data tunnel 4_14 (source address is the outer destination IP address GroupIP1 in the VXLAN encapsulation, destination address is the outer source IP address IP 4_4 in the VXLAN encapsulation) |

If there is, the ARP request packet 11 is ignored. If there is not, the ARP entry as shown in table 6 is learnt.

VTEP 4_1 receives the ARP request packet 12 transmitted by VTEP 4_4, finds that the outer destination IP address in the IP header of the VXLAN encapsulation of the ARP request packet 12 is the VTEP IP address of VTEP 4_1, modifies the outer destination IP address to the IP address GroupIP1 of the VXLAN IP gateway group, then determines whether it has an ARP entry containing the contents as shown in table 6. If it has, the ARP request packet 12 is ignored. Otherwise, the ARP entry as shown in table 6 is learnt.

VTEP 4_2 receives the ARP request packet 13 transmitted by VTEP 4_4, finds that the outer destination IP address in the IP header of the VXLAN encapsulation of the ARP request packet 13 is the VTEP IP address of VTEP 4_2, modifies the outer destination IP address to the IP address GroupIP1 of the VXLAN IP gateway group, then determines whether it has an ARP entry containing the contents as shown in table 7.

TABLE 7

| IP | MAC | VXLAN ID | VXLAN tunnel |
|---|---|---|---|
| IP1 | MAC1 | VXLAN A | VXLAN data tunnel 4_24 (source address is the outer destination IP address GroupIP1 in the VXLAN encapsulation, destination address is the outer source IP address IP 4_4 in the VXLAN encapsulation) |

If it has, the ARP request packet 13 is ignored. Otherwise, the ARP entry as shown in table 7 is learnt.

VTEP 4_3 receives the ARP request packet 14 transmitted by VTEP 4_4, finds that the outer destination IP address in the IP header of the VXLAN encapsulation of the ARP request packet 14 is the VTEP IP address of VTEP 4_3, modifies the outer destination IP address to the IP address GroupIP1 of the VXLAN IP gateway group, then determines whether it has an ARP entry containing the contents as shown in table 8.

TABLE 8

| IP | MAC | VXLAN ID | VXLAN tunnel |
|---|---|---|---|
| IP1 | MAC1 | VXLAN A | VXLAN data tunnel 4_34 (source address is the outer destination IP address GroupIP1 in the VXLAN encapsulation, destination address is the outer source IP address IP 4_4 in the VXLAN encapsulation) |

If it has, the ARP request packet 14 is ignored. Otherwise, the ARP entry as shown in table 8 is learnt.

Now, the example as shown in FIG. 4 is finished.

Through the example as shown in FIG. 4, VTEP 4_1 to VTEP 4_3 acting as the VXLAN IP gateways in the VXLAN IP gateway group have learnt the ARP entry matching VM1 (including the MAC address MAC1 and IP address IP1 of VM1). Thereafter, no matter which one of VTEP 4_1, VTEP 4_2 and VTEP 4_3 acting as the VXLAN IP gateways in the VXLAN IP gateway group receives a service packet destined to VM1, it is able to forward the service packet according to the learnt ARP entry matching with VM1, which avoids the problem that the VXLAN IP gateway cannot successfully forward service packet.

Figure 5:
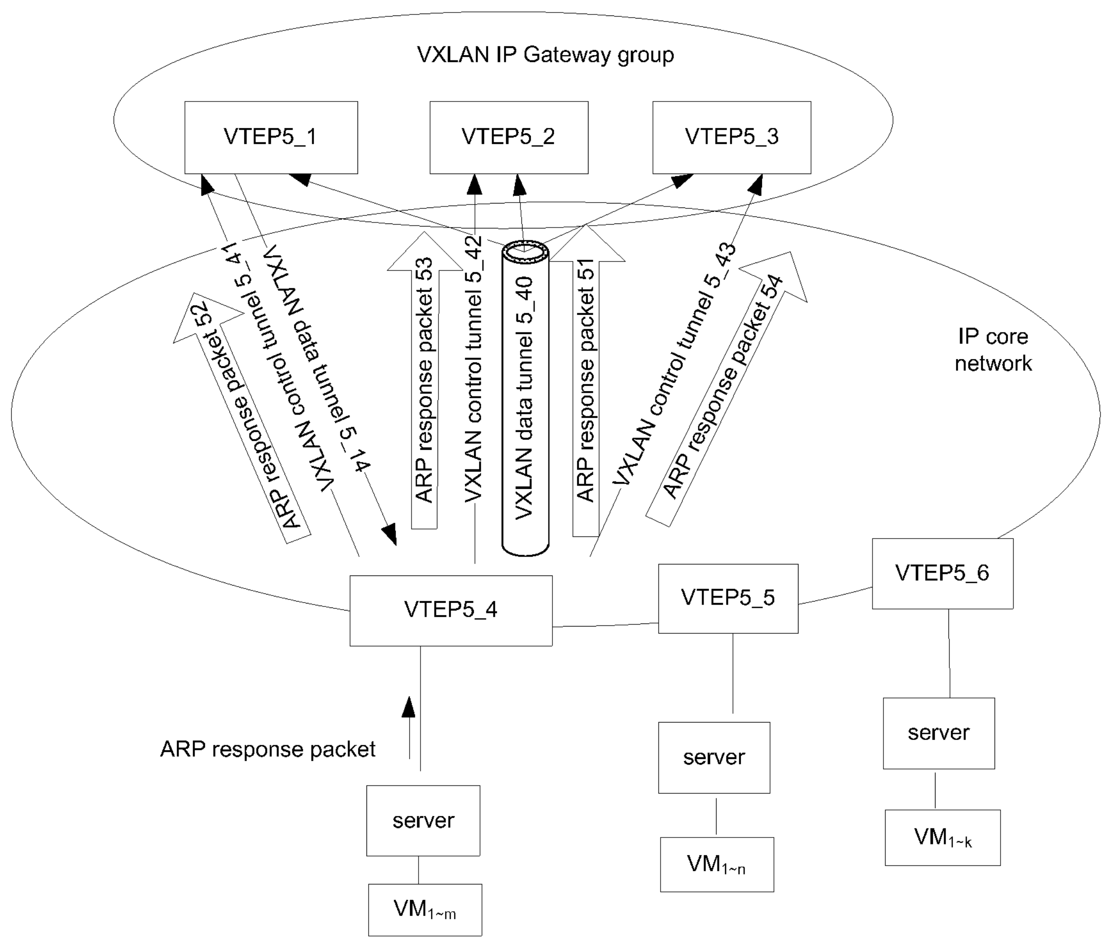
FIG. 5 is a schematic diagram illustrating another network according to various examples of the present disclosure.

FIG. 5 is a schematic diagram illustrating another network structure provided by various examples of the present disclosure. As shown in FIG. 5, VTEP 5_1, VTEP 5_2 and VTEP 5_3 are configured as VXLAN IP gateways. VTEP 5_1, VTEP 5_2 and VTEP 5_3 are referred to as second VTEPs. In FIG. 5, the remaining VTEP 5_4 to VTEP 5_6 are referred to as first VTEPs.

VTEP 5_1, VTEP 5_2 and VTEP 5_3 form a VXLAN IP gateway group. VTEP 5_1, VTEP 5_2 and VTEP 5_3 play the same role in the VXLAN IP gateway group and there is no role election. Therefore, the VXLAN IP gateway group is referred to as a stateless VXLAN IP gateway group. The VXLAN IP gateway group is transparent for the first VTEPs and may be treated as one device.

The VXLAN IP gateway group is configured with a VTEP group IP address (GroupIP2), VTEP 5_1 to VTEP 5_3 in the VXLAN IP gateway group are members of the VXLAN IP gateway group and have different VTEP IP addresses (also referred to as member IP addresses). The member IP addresses of VTEP 5_1 to VTEP 5_3 are respectively noted by Member IP 5_1, Member IP 5_2 and Member IP 5_3. Table 9 shows the IP address of the VXLAN IP gateway group and the IP addresses of the members of the VXLAN IP gateway group.

TABLE 9

| IP address of the VXLAN IP gateway group | IP addresses of members of the VXLAN IP gateway group |
|---|---|
| GroupIP2 | Member IP 5_1<br>Member IP 5_2<br>Member IP 5_3 |

In FIG. 5, VTEP 5_1 is taken as an example VXLAN IP gateway. VTEP 5_1 establishes a VXLAN data tunnel from VTEP 5_1 to VTEP 5_4, denoted by VXLAN data tunnel 5_14. The VXLAN associated with the VXLAN data tunnel 5_14 is VXLAN B. The source address of the VXLAN data tunnel 5_14 is GroupIP2, the destination address is the IP address IP 5_4 of VTEP 5_4.

VTEP 5_1 establishes a VXLAN data tunnel from VTEP 5_1 to VTEP 5_5, denoted by VXLAN data tunnel 5_15. The VXLAN associated with the VXLAN data tunnel 5_15 is VXLAN B. The source address of the VXLAN data tunnel 5_15 is GroupIP2, the destination address is the IP address IP 5_5 of VTEP 5_5.

VTEP 5_1 establishes a VXLAN data tunnel from VTEP 5_1 to VTEP 5_6, denoted by VXLAN data tunnel 5_16. The VXLAN associated with the VXLAN data tunnel 5_16 is VXLAN B. The source address of the VXLAN data tunnel 5_16 is GroupIP2, the destination address is the IP address IP 5_6 of VTEP 5_6.

Table 10 shows the VXLAN data tunnels established by VTEP 5_1

TABLE 10

| VXLAN ID | VXLAN tunnels |
|---|---|
| VXLAN B | VXLAN data tunnel 5_14 (source address is GroupIP2, destination address is the IP address IP 5_4 of VTEP 5_4) |
| VXLAN B | VXLAN data tunnel 5_15 (source address is GroupIP2, destination address is the IP address IP 5_5 of VTEP 5_5) |
| VXLAN B | VXLAN data tunnel 5_16 (source address is GroupIP2, destination address is the IP address IP 5_6 of VTEP 5_6) |

In FIG. 5, acting as a VXLAN IP gateway, VTEP 5_2 establishes VXLAN data tunnels as shown in Table 11 according to a manner similarly as that of VTEP 5_1.

TABLE 11

| VXLAN ID | VXLAN tunnels |
|---|---|
| VXLAN B | VXLAN data tunnel 5_24 (source address is GroupIP2, destination address is the IP address IP 5_4 of VTEP 5_4) |
| VXLAN B | VXLAN data tunnel 5_25 (source address is GroupIP2, destination address is the IP address IP 5_5 of VTEP 5_5) |
| VXLAN B | VXLAN data tunnel 5_26 (source address is GroupIP2, destination address is the IP address IP 5_6 of VTEP 5_6) |

In FIG. 5, acting as a VXLAN IP gateway, VTEP 5_3 establishes VXLAN data tunnels as shown in Table 12 according to a manner similarly as that of VTEP 5_1.

TABLE 12

| VXLAN ID | VXLAN tunnels |
|---|---|
| VXLAN B | VXLAN data tunnel 5_34 (source address is GroupIP2, destination address is the IP address IP 5_4 of VTEP 5_4) |
| VXLAN B | VXLAN data tunnel 5_35 (source address is GroupIP2, destination address is the IP address IP 5_5 of VTEP 5_5) |
| VXLAN B | VXLAN data tunnel 5_36 (source address is GroupIP2, destination address is the IP address IP 5_6 of VTEP 5_6) |

Take the VTEP 5_4 in FIG. 5 as an example first VTEP. VTEP 5_4 establishes a VXLAN data tunnel from VTEP 5_4 to the VXLAN IP gateway group, denoted by VXLAN data tunnel 5_40. The VXLAN associated with the VXLAN data tunnel 5_40 is VXLAN B. The source address of the VXLAN data tunnel 5_40 is the VTEP IP address of VTEP 5_4 (denoted by IP 5_4), the destination address is the IP address GroupIP2 of the VXLAN IP gateway group. VTEP 5_4 has three local tunnel ports associated with the VXLAN data tunnel 5_40, respectively denoted by port p51, port p52 and port p53 (not shown in FIG. 5), wherein port p51 points to VTEP 5_1, port p52 points to VTEP 5_2, and port p53 points to VTEP 5_3.

In FIG. 5, VTEP 5_4 establishes a VXLAN control tunnel from VTEP 5_4 to VTEP 5_1, denoted by VXLAN control tunnel 5_41. The VXLAN associated with the VXLAN control tunnel 5_41 is VXLAN B. The source address of VXLAN control tunnel 5_41 is the VTEP IP address IP 5_4 of VTEP 5_4, the destination address is the member IP address Member IP 5_1 of VTEP 5_1.

VTEP 5_4 establishes a VXLAN control tunnel from VTEP 5_4 to VTEP 5_2, denoted by VXLAN control tunnel 5_42. The VXLAN associated with the VXLAN control tunnel 5_42 is VXLAN B. The source address of VXLAN control tunnel 5_42 is the VTEP IP address IP 5_4 of VTEP 5_4, the destination address is the member IP address Member IP 5_2 of VTEP 5_2.

VTEP 5_4 establishes a VXLAN control tunnel from VTEP 5_4 to VTEP 5_3, denoted by VXLAN control tunnel 5_43. The VXLAN associated with the VXLAN control tunnel 5_43 is VXLAN B. The source address of VXLAN control tunnel 5_43 is the VTEP IP address IP 5_4 of VTEP 5_4, the destination address is the member IP address Member IP 5_3 of VTEP 5_3.

Table 13 shows the VXLAN data tunnel and VXLAN control tunnels established by VTEP 5_4.

TABLE 13

| VXLAN ID | VXLAN tunnels |
|---|---|
| VXLAN B | VXLAN data tunnel 5__40 (source address is IP 5__4, destination address is GroupIP2), associated with 3 tunnel ports, p51, p52, p53, wherein p51 points to VTEP 5__1, p52 points to VTEP 5__2, p53 points to VTEP 5__3 |
| VXLAN B | VXLAN control tunnel 5__41 (source address is IP 5__4, destination address is Member IP 5__1) |
| VXLAN B | VXLAN control tunnel 5__42 (source address is IP 5__4, destination address is Member IP 5__2) |
| VXLAN B | VXLAN control tunnel 5__43 (source address is IP 5__4, destination address is Member IP 5__3) |

For other first VTEPs in FIG. 5, e.g., VTEP 5_5 to VTEP 5_6, the VXLAN data tunnel and the VXLAN control tunnels may be established similarly as those established by the VTEP 5_4, which is not repeated herein.

Based on the establishment of the VXLAN data tunnels and the VXLAN control tunnels as described above, the packet forwarding based on the VXLAN data tunnels and the VXLAN control tunnels are described hereinafter.

In FIG. 5, when forwarding a data packet whose destination IP address is the IP address IP2 of VM2, VTEP 5_1 determines it does not have an ARP entry matching with IP2. It generates 3 duplicated ARP request packets based on the three VXLAN data tunnels as shown in Table 10, denoted by ARP request packets 21 to 23.

VTEP 5_1 performs VXLAN encapsulation to the ARP request packet 21 according to VXLAN data tunnel 5_14, the VNI in the VXLAN header of the VXLAN encapsulation is VXLAN B, an outer source IP address in an IP header of the VXLAN encapsulation is the source address GroupIP2 of the VXLAN data tunnel 5_14, an outer destination IP address is the destination address IP 5_4 of the VXLAN data tunnel 5_14. For facilitating the description, the ARP request packet 21 after the VXLAN encapsulation is referred to ARP request packet 31. VTEP 5_1 transmits the ARP request packet 31 via the local VXLAN data tunnel 5_14.

VTEP 5_1 performs VXLAN encapsulation to the ARP request packet 22 according to VXLAN data tunnel 5_15, the VNI in the VXLAN header of the VXLAN encapsulation is VXLAN B, an outer source IP address in an IP header of the VXLAN encapsulation is the source address GroupIP2 of the VXLAN data tunnel 5_15, an outer destination IP address is the destination address IP 5_5 of the VXLAN data tunnel 5_15. For facilitating the description, the ARP request packet 22 after the VXLAN encapsulation is referred to ARP request packet 32. VTEP 5_1 transmits the ARP request packet 32 via the local VXLAN data tunnel 5_15.

VTEP 5_1 performs VXLAN encapsulation to the ARP request packet 23 according to VXLAN data tunnel 5_16, the VNI in the VXLAN header of the VXLAN encapsulation is VXLAN B, an outer source IP address in an IP header of the VXLAN encapsulation is the source address GroupIP2 of the VXLAN data tunnel 5_16, an outer destination IP address is the destination address IP 5_6 of the VXLAN data tunnel 5_16. For facilitating the description, the ARP request packet 23 after the VXLAN encapsulation is referred to ARP request packet 33. VTEP 5_1 transmits the ARP request packet 33 via the local VXLAN data tunnel 5_16.

After receiving the ARP request packet 31, VTEP 5_4 performs a VXLAN decapsulation to the ARP request packet 31 (i.e. obtain the above ARP request packet 21), determines whether the destination IP address IP2 of the ARP request packet 21 is the IP address of a local host. If yes, it transmits the ARP request packet 21 to the destination IP address. Otherwise, it ignores the ARP request packet 21. After receiving the ARP request packet 32 and ARP request packet 33, VTEP 5_5 and VTEP 5_6 process similarly as VTEP 5_4. Hereinafter, suppose that the destination IP address IP2 of the ARP request packet 21 is the IP address of the local host VM2 of VTEP 5_4.

After receiving the ARP request packet 21, VM2 finds that the destination IP address of the ARP request packet 21 is the local IP address, it returns an ARP response packet. The source IP address of the ARP response packet is IP2 and the source MAC address is MAC2.

After receiving the ARP response packet, VTEP 5_4 finds that there are 4 tunnels as shown in Table 13, it generates 4 duplicated ARP response packets, denoted by ARP response packets 41 to 44.

VTEP 5_4 performs a VXLAN encapsulation to the ARP response packet 41 according to the VXLAN data tunnel 5_40, the VNI in the VXLAN header of the VXLAN encapsulation is VXLAN B, the outer source IP address in an IP header of the VXLAN encapsulation is the source address IP 5_4 of the VXLAN data tunnel 5_40, the outer destination IP address is the destination address GroupIP2 of the VXLAN data tunnel 5_40. VTEP 5_4 selects one port from the ports p51 to p53 associated with the VXLAN data tunnel 5_40 (suppose that port p51 is selected). VTEP 5_4 transmits the encapsulated ARP response packet 41 via the port p51. For facilitating the description, the ARP response packet 41 after the VXLAN encapsulation is referred to ARP response packet 51.

VTEP 5_4 performs VXLAN encapsulation to the ARP response packet 42 according to the VXLAN control tunnel 5_41, the VNI in the VXLAN header of the VXLAN encapsulation is VXLAN B, the outer source IP address in the IP header of the VXLAN encapsulation is the source address IP 5_4 of the VXLAN control tunnel 5_41, the outer destination IP address is the destination address Member IP 5_1 of the VXLAN control tunnel 5_41. VTEP 5_4 transmits the encapsulated ARP response packet 42 via the VXLAN control tunnel 5_41. For facilitating the description, the ARP response packet 42 after the VXLAN encapsulation is referred to as ARP response packet 52.

VTEP 5_4 performs VXLAN encapsulation to the ARP response packet 43 according to the VXLAN control tunnel 5_42, the VNI in the VXLAN header of the VXLAN encapsulation is VXLAN B, the outer source IP address in the IP header of the VXLAN encapsulation is the source address IP 5_4 of the VXLAN control tunnel 5_42, the outer destination IP address is the destination address Member IP 5_2 of the VXLAN control tunnel 5_42. VTEP 5_4 transmits the encapsulated ARP response packet 43 via the VXLAN control tunnel 5_42. For facilitating the description, the ARP response packet 43 after the VXLAN encapsulation is referred to as ARP response packet 53.

VTEP 5_4 performs VXLAN encapsulation to the ARP response packet 44 according to the VXLAN control tunnel 5_43, the VNI in the VXLAN header of the VXLAN encapsulation is VXLAN B, the outer source IP address in the IP header of the VXLAN encapsulation is the source address IP 5_4 of the VXLAN control tunnel 5_43, the outer destination IP address is the destination address Member IP 5_3 of the VXLAN control tunnel 5_43. VTEP 5_4 transmits the encapsulated ARP response packet 44 via the VXLAN control tunnel 5_43. For facilitating the description, the ARP response packet 44 after the VXLAN encapsulation is referred to as ARP response packet 54.

VTEP 5_1 receives the ARP response packet 51 transmitted by VTEP 5_4, finds that the outer destination IP address in the IP header of the VXLAN encapsulation of the ARP response packet 51 is the IP address GroupIP2 of the VXLAN IP gateway group, and then determines whether it has an ARP entry containing the contents as shown in Table 14.

TABLE 14

| IP | MAC | VXLAN ID | VXLAN tunnel |
|---|---|---|---|
| IP2 | MAC2 | VXLAN B | VXLAN data tunnel 5__14 (source address is outer destination IP address GroupIP2 in the VXLAN encapsulation, destination address is the outer source IP address IP 5__4 in the VXLAN encapsulation) |

If it has, it ignores the ARP response packet 51. Otherwise, it learns the ARP entry as shown in Table 14.

VTEP 5_1 receives the ARP response packet 52 transmitted by VTEP 5_4, finds that the outer destination IP address in the IP header of the VXLAN encapsulation of the ARP response packet 52 is the VTEP IP address IP5_1 of VTEP 5_1, modifies the outer destination IP address to the IP address GroupIP2 of the VXLAN IP gateway group, and then determines whether it has an ARP entry containing contents as shown in Table 14. If yes, it ignores the ARP response packet 52; otherwise, it learns the ARP entry as shown in Table 14.

VTEP 5_2 receives the ARP response packet 53 transmitted by VTEP 5_4, finds that the outer destination IP address in the IP header of the VXLAN encapsulation of the ARP response packet 53 is the VTEP IP address IP5_2 of VTEP 5_2, modifies the outer destination IP address to the IP address GroupIP2 of the VXLAN IP gateway group, and then determines whether it has an ARP entry containing contents as shown in Table 15. If yes, it ignores the ARP response packet 53; otherwise, it learns the ARP entry as shown in Table 15.

TABLE 15

| IP | MAC | VXLAN ID | VXLAN tunnel |
|---|---|---|---|
| IP2 | MAC2 | VXLAN B | VXLAN data tunnel 5__24 (source address is outer destination IP address GroupIP2 in the VXLAN encapsulation, destination address is the outer source IP address IP 5__4 in the VXLAN encapsulation) |

VTEP 5_3 receives the ARP response packet 54 transmitted by VTEP 5_4, finds that the outer destination IP address in the IP header of the VXLAN encapsulation of the ARP response packet 54 is the VTEP IP address IP5_3 of VTEP 5_3, modifies the outer destination IP address to the IP address GroupIP2 of the VXLAN IP gateway group, and then determines whether it has an ARP entry containing contents as shown in Table 16. If yes, it ignores the ARP response packet 54; otherwise, it learns the ARP entry as shown in Table 16.

TABLE 16

| IP | MAC | VXLAN ID | VXLAN tunnel |
|---|---|---|---|
| IP2 | MAC2 | VXLAN B | VXLAN data tunnel 5__34 (source address is outer destination IP address GroupIP2 in the VXLAN encapsulation, destination address is the outer source IP address IP 5__4 in the VXLAN encapsulation) |

Thereafter, VTEP 5_1 performs subsequent forwarding to the above data packet according to the learnt ARP entry as shown in Table 14.

Now, the description of the example as shown in FIG. 5 is finished.

Through the example as shown in FIG. 5, VTEP 5_1 to VTEP 5_3 acting as the VXLAN IP gateways in the VXLAN IP gateway group initiatively transmit ARP request packets to learn the ARP entry matching VM2 (including the MAC address MAC2 and IP address IP2 of VM2). Thereafter, no matter which one of VTEP 5_1, VTEP 5_2 and VTEP 5_3 acting as the VXLAN IP gateways in the VXLAN IP gateway group receives a service packet destined to VM2, it is able to forward the service packet according to the learnt ARP entry matching with VM2, which avoids the problem that the VXLAN IP gateway cannot successfully forward service packet.

The above describes the method provided by the present disclosure. Hereinafter, an apparatus provided by the present disclosure is described.

Figure 6:
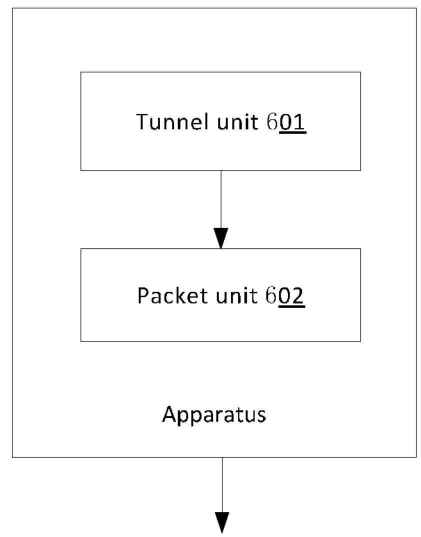
FIG. 6 is a schematic diagram illustrating a structure of an apparatus according to various examples of the present disclosure.

FIG. 6 is a schematic diagram illustrating a structure of an apparatus according to various examples of the present disclosure. As shown in FIG. 6, the apparatus is applied to a first VTEP. The apparatus may include:

a tunnel unit 601, to establish a VXLAN data tunnel from the first VTEP to a VXLAN IP gateway group, a source address of the VXLAN data tunnel is a VTEP IP address of the first VTEP, a destination address is a VTEP group IP address of the VXLAN IP gateway group; the VXLAN IP gateway group includes N VXLAN IP gateways in a VXLAN, wherein N is larger than 1, the VXLAN IP gateways are second VTEPs in the VXLAN, and different VXLAN IP gateways have different VTEP IP addresses; and to establish a VXLAN control tunnel from the first VTEP to each VXLAN IP gateway in the VXLAN IP gateway group, a source address of the VXLAN control tunnel is the VTEP IP address of the first VTEP, a destination address is the VTEP IP address of the VXLAN IP gateway, the VXLAN control tunnel and the VXLAN data tunnel are associated with same VXLAN identifier; and a packet unit 602, to transmit ARP packets respectively via the VXLAN data tunnel and VXLAN control tunnel.

In examples of the present disclosure, the first VTEP has N tunnel ports associated with the VXLAN data tunnel.

the packet unit 602 is further to perform the following to transmit the ARP packet via the VXLAN data tunnel:

perform a VXLAN encapsulation to the ARP packet according to the VXLAN data tunnel, select one tunnel port from the N tunnel ports to forward the VXLAN encapsulated ARP packet. There may be various manners to select one tunnel port from the N tunnel ports, e.g., hash algorithm, etc. The detailed selection manner is not restricted in the present disclosure.

The VXLAN encapsulation performed to the ARP packet according to the VXLAN data tunnel may include: a UDP header, a VXLAN header, an IP header, etc. The VXLAN header includes at least a VNI. The VNI may be associated with the VXLAN data tunnel. The IP header may include at least an outer source IP address, an outer destination IP address, etc. The outer source IP address is the source address of the VXLAN data tunnel, i.e., the VTEP IP address of the first VTEP. The outer destination IP address is the destination address of the VXLAN data tunnel, i.e., the VTEP group IP address of the VXLAN IP gateway group.

In some examples of the present disclosure, the packet unit 602 is further to perform the following to transmit the ARP packet via the VXLAN control tunnel:

perform a VXLAN encapsulation to the ARP packet according to the VXLAN control tunnel, and forward the VXLAN encapsulated ARP packet via a tunnel port connected with the VXLAN control tunnel on the VTEP.

The VXLAN encapsulation to the ARP packet according to the VXLAN control tunnel may include: a UDP header, a VXLAN header, an IP header, etc. The VXLAN header includes at least a VNI. The VNI may be associated with the VXLAN control tunnel. The IP header includes at least an outer source IP address, an outer destination IP address, etc. The outer source IP address is the source address of the VXLAN control tunnel, i.e., the VTEP IP address of the first VTEP. The outer destination IP address is the destination address of the VXLAN control tunnel, i.e., the VTEP IP address of the VXLAN IP gateway.

Now, the description to the apparatus as shown in FIG. 6 is finished.

Figure 7:
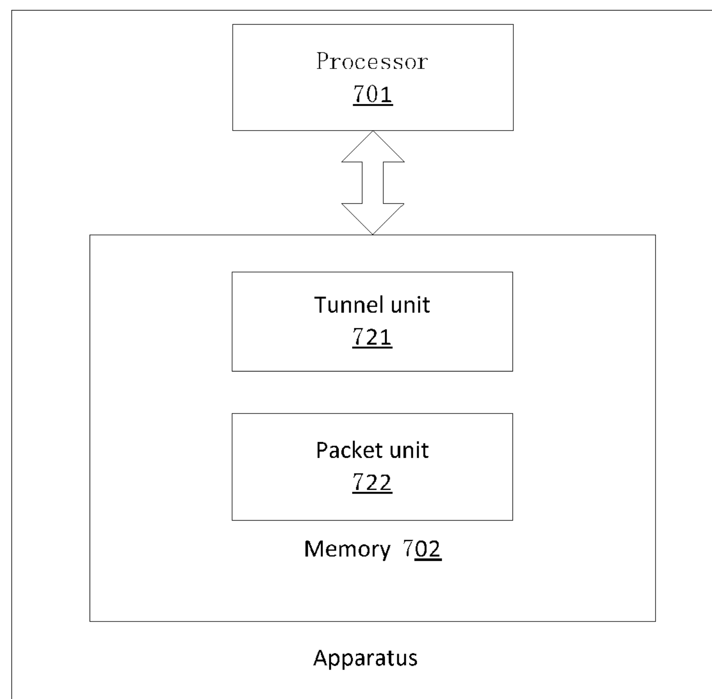
FIG. 7 is a schematic diagram illustrating a hardware structure of the apparatus as shown in FIG. 6 according to various examples of the present disclosure.

Some examples of the present disclosure further provide a hardware structure of the apparatus as shown in FIG. 6. FIG. 7 is a schematic diagram illustrating a hardware structure of the apparatus as shown in FIG. 6 according to various examples of the present disclosure. As shown in FIG. 7, the apparatus may include:

a processor 701 and a memory 702;

the memory 702 stores a tunnel unit 721 and a packet unit 722;

the processor 701 stores a program for controlling the execution of the tunnel unit 721 and controls the tunnel unit 721 in the memory 702 to perform the acts of: establishing a VXLAN data tunnel from a first VTEP to a VXLAN IP gateway group, establishing a VXLAN control tunnel from the first VTEP to each VXLAN IP gateway in the VXLAN IP gateway group, the established VXLAN data tunnel and the VXLAN control tunnel are as described in the above examples; and stores a program for controlling the execution of the packet unit 722 and controls the packet unit 722 in the memory 702 to perform the acts of: transmitting an ARP packet respectively via the VXLAN data tunnel and the VXLAN control tunnel.

Now, the description of the hardware structure as shown in FIG. 7 is finished.

Figure 8:
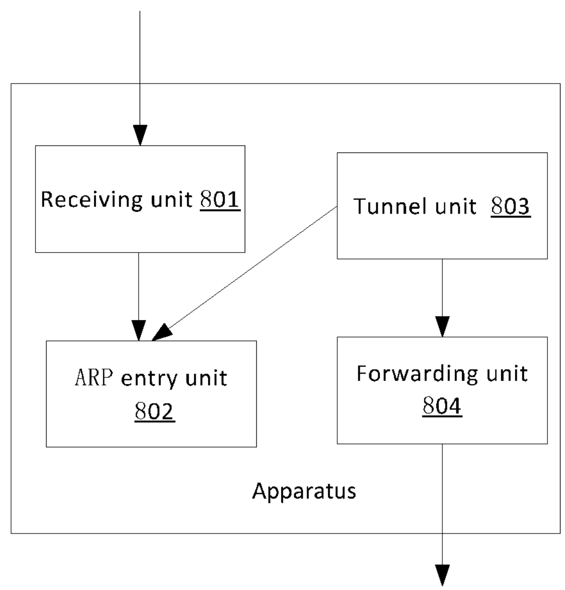
FIG. 8 is a schematic diagram illustrating a structure of another apparatus according to various examples of the present disclosure.

FIG. 8 is schematic diagram illustrating a structure of another apparatus provided by various examples of the present disclosure. As shown in FIG. 8, a VXLAN where the apparatus is applied includes a VXLAN IP gateway group consisting of N different VXLAN IP gateways. The VXLAN IP gateway group is configured with a VTEP group IP address. Each VXLAN IP gateway in the VXLAN IP gateway group has a different IP address. The VXLAN IP gateways are second VTEPs in the VXLAN. The VXLAN further includes a first VTEP. The apparatus is applied to the VXLAN IP gateway. As shown in FIG. 8, the apparatus may include:

a receiving unit 801, to receive an ARP packet transmitted by the first VTEP; the received ARP packet may be an ARP request packet or an ARP response packet, which is not restricted in the present disclosure;

an ARP entry unit 802, to determine whether an outer destination IP address in a VXLAN encapsulation of the ARP packet is an IP address of the VXLAN IP gateway;

if it is not, learn an ARP entry according to the ARP packet;

if it is, modify the outer destination IP address to the VTEP group IP address, and learn an ARP entry according to the modified ARP packet.

In some examples, as shown in FIG. 8, the apparatus may further include:

a tunnel unit 803, to establish a VXLAN data tunnel from the VXLAN IP gateway to each first VTEP; a source address of the VXLAN data tunnel is the VTEP group IP address, a destination address is the IP address of the first VTEP; wherein the VXLAN data tunnels established with different first VTEPs have different VXLAN data tunnel identifiers; and a forwarding unit 804, to transmit a packet to the first VTEP via the VXLAN data tunnel established from the VXLAN IP gateway to the first VTEP.

The ARP entry unit 802 is further to perform the following operations to learn the ARP entry according to the ARP packet:

determine whether the VXLAN IP gateway stores an ARP entry with the following contents:

a VXLAN identifier in the VXLAN encapsulation, host information in the ARP packet, and an identifier of a VXLAN data tunnel, wherein a source address of the VXLAN data tunnel is the outer destination IP address in the VXLAN encapsulation, and a destination address of the VXLAN data tunnel is the outer source IP address in the VXLAN encapsulation.

The ARP entry unit 802 is further to perform the following operations to learn the ARP entry according to the modified ARP packet:

determine whether the VXLAN IP gateway stores an ARP entry with the following contents:

a VXLAN identifier in the VXLAN encapsulation, host information in the ARP packet, and an identifier of a VXLAN data tunnel, wherein a source address of the VXLAN data tunnel is the outer destination IP address in the VXLAN encapsulation, and a destination address of the VXLAN data tunnel is the outer source IP address in the VXLAN encapsulation;

if there is not, learn the ARP entry containing the above contents.

Now, the description to the apparatus as shown in FIG. 8 is finished.

Figure 9:
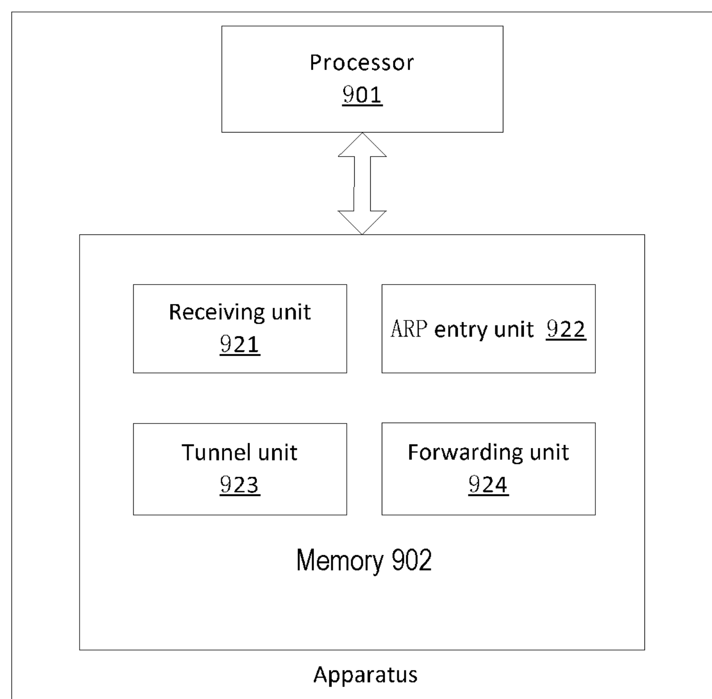
FIG. 9 is a schematic diagram illustrating a hardware structure of the apparatus as shown in FIG. 8 according to various examples of the present disclosure.

Some examples of the present disclosure provide a hardware structure for the apparatus as shown in FIG. 8. FIG. 9 is a schematic diagram illustrating a hardware structure of the apparatus as shown in FIG. 8 according to various examples of the present disclosure. As shown in FIG. 9, the apparatus may include:

a processor 901 and a memory 902;

the processor 901 is to store a receiving unit 921 and an ARP entry unit 922;

the processor 901 stores a program to control the receiving unit 921 and controls the receiving unit 921 in the memory 902 to perform the acts of: receiving an ARP packet transmitted by a first VTEP; and stores a program to control the ARP entry unit 922 and controls the ARP entry unit 922 in the memory 902 to perform the acts of: determining whether an outer destination IP address in the VXLAN encapsulation of the ARP packet is the IP address of the VXLAN IP gateway; if not, learn an ARP entry according to the ARP packet; otherwise, modify the outer destination IP address to the VTEP group IP address, and learn an ARP entry according to the modified ARP packet.

In some examples, the memory 902 further includes a tunnel unit 923, and a forwarding unit 924;

the processor 901 further stores a program for controlling the execution of the tunnel unit 923 and controls the tunnel unit 923 in the memory 902 to perform the acts of: establishing a VXLAN data tunnel from the VXLAN IP gateway to the first VTEP, the source address of the VXLAN data tunnel is the VTEP group IP address, the destination address is the IP address of the first VTEP; the VXLAN data tunnels established from the VXLAN IP gateway to different first VTEPs haves different VXLAN data tunnel identifiers; and stores a program for controlling execution of the forwarding unit 924 and controls the forwarding unit 924 in the memory 902 to perform the acts of: when transmitting ARP packet or data packet to the first VTEP, transmitting the ARP packet or data packet via the VXLAN data tunnel established between the VXLAN IP gateway and the first VTEP.

Now, the description to the hardware structure as shown in FIG. 9 is finished.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

The invention claimed is:

1. A packet forwarding method applied to a virtual extensible local area network (VXLAN), comprising:

establishing, by a first VXLAN tunnel end point (VTEP), a VXLAN data tunnel from the first VTEP to a VXLAN IP gateway group, wherein a source address of the VXLAN data tunnel is a VTEP IP address of the first VTEP, a destination address is a VTEP group IP address of the VXLAN IP gateway group;

the VXLAN IP gateway group comprises N VXLAN IP gateways in the VXLAN, N is an integer larger than 1, each of the VXLAN IP gateways is a second VTEP in the VXLAN, different VXLAN IP gateways have different VTEP IP addresses;

establishing, by the first VTEP, a VXLAN control tunnel from the first VTEP to each of the VXLAN IP gateways in the VXLAN IP gateway group, a source address of the VXLAN control tunnel is the VTEP IP address of the first VTEP, a destination address of the VXLAN control tunnel is a VTEP IP address of each of the VXLAN IP gateways, the VXLAN control tunnel and the VXLAN data tunnel are associated with a same VXLAN identifier; and transmitting, by the first VTEP, an address resolution protocol (ARP) packet respectively via the VXLAN data tunnel and the VXLAN control tunnel.

2. The method of claim 1, wherein the first VTEP comprises N tunnel ports associated with the VXLAN data tunnel;

the transmitting the ARP packet via the VXLAN data tunnel comprises:

performing a VXLAN encapsulation to the ARP packet according to the VXLAN data tunnel, and selecting one tunnel port from the N tunnel ports to forward the VXLAN encapsulated ARP packet.

3. A packet forwarding method applied to a virtual extensible local area network (VXLAN), comprising:

receiving, by a VXLAN IP gateway of a VXLAN IP gateway group in the VXLAN, an address resolution protocol (ARP) packet transmitted by a first VXLAN tunnel end point (VTEP) in the VXLAN via a VXLAN control tunnel between the VXLAN IP gateway and the first VTEP, wherein the VXLAN IP gateway group consists of N VXLAN IP gateways and is configured with a VTEP group IP address, different VXLAN IP gateways in the VXLAN IP gateway group have different VTEP IP addresses, each of the VXLAN IP gateways is a second VTEP in the VXLAN, a source address of the VXLAN control tunnel is the VTEP IP address of the first VTEP, and a destination address of the VXLAN control tunnel is a VTEP IP address of the VXLAN IP gateway;

determining, by the VXLAN IP gateway, whether an outer destination IP address in a VXLAN encapsulation of the ARP packet is a VTEP IP address of the VXLAN IP gateway;

if the outer destination IP address in the VXLAN encapsulation of the ARP packet is not the VTEP IP address of the VXLAN IP gateway, learning, by the VXLAN IP gateway, an ARP entry according to the ARP packet;

if the outer destination IP address in the VXLAN encapsulation of the ARP packet is the VTEP IP address of the VXLAN IP gateway, modifying, by the VXLAN IP gateway, the outer destination IP address to the VTEP IP group address, and learning, by the VXLAN IP gateway, an ARP entry according to a modified ARP packet;

establishing, by the VXLAN IP gateway, a VXLAN data tunnel from the VXLAN IP gateway to the respective first VTEP, a source address of the VXLAN data tunnel is the VTEP group IP address, a destination address of the VXLAN data tunnel is the IP address of the first VTEP, wherein VXLAN data tunnels established with different first VTEPs have different VXLAN data tunnel identifiers; and transmitting, by the VXLAN IP gateway, a second ARP packet to the first VTEP via the VXLAN data tunnel established from the VXLAN IP gateway to the first VTEP.

4. The method of claim 3, wherein the learning the ARP entry according to the ARP packet comprises:

determining whether the VXLAN IP gateway stores an ARP entry with the following contents:

a VXLAN identifier (VNID) in the VXLAN encapsulation, host information in the ARP packet, and an identifier of a VXLAN data tunnel, wherein a source address of the VXLAN data tunnel is the outer destination IP address in the VXLAN encapsulation, and a destination address of the VXLAN data tunnel is the outer source IP address in the VXLAN encapsulation;

if the VXLAN IP gateway does not store the ARP entry, learning an ARP entry comprising the contents;

the learning the ARP entry according to the modified ARP packet comprises:

determining whether the VXLAN IP gateway stores an ARP entry with the following contents:

a VXLAN identifier (VNID) in the VXLAN encapsulation, host information in the ARP packet, and an identifier of a VXLAN data tunnel, wherein a source address of the VXLAN data tunnel is the outer destination IP address in the VXLAN encapsulation, and a destination address of the VXLAN data tunnel is the outer source IP address in the VXLAN encapsulation;

if the VXLAN IP gateway does not store the ARP entry, learning an ARP entry comprising the contents.

5. A packet forwarding apparatus for executing the method of claim 3, comprising: a memory; and a processor executing the following operations by reading a program from the memory:

receiving an ARP packet transmitted by the first VTEP via a VXLAN control tunnel between the VXLAN IP gateway and the first VTEP, wherein a source address of the VXLAN control tunnel is the VTEP IP address of the first VTEP, a destination address of the VXLAN control tunnel is a VTEP IP address of the VXLAN IP gateway:

determining whether an outer destination IP address in a VXLAN encapsulation of the ARP packet is the VTEP IP address of the VXLAN IP gateway;

if the outer destination IP address in the VXLAN encapsulation of the ARP packet is not the VTEP IP address of the VXLAN IP gateway, learn an ARP entry according to the ARP packet; and if the outer destination IP address in the VXLAN encapsulation of the ARP packet is the VTEP IP address of the VXLAN IP gateway, modify the outer destination IP address to the VTEP group IP address, and learn an ARP entry according to the modified ARP packet;

establishing a VXLAN data tunnel from the VXLAN IP gateway to respective first VTEP;

a source address of the VXLAN data tunnel is the VTEP group IP address, a destination address of the VXLAN data tunnel is the IP address of the first VTEP;

VXLAN data tunnels established with different first VTEPs have different VXLAN data tunnel identifiers; and transmitting the second packet to the first VTEP through the VXLAN data tunnel established from the VXLAN IP gateway to the first VTEP.

6. The packet forwarding apparatus of claim 5, wherein the processor is further configured to execute the following operations by reading the program:

determining whether the VXLAN IP gateway stores an ARP entry with the following contents:

a VXLAN identifier (VNID) in the VXLAN encapsulation, host information in the ARP packet, and an identifier of a VXLAN data tunnel, wherein a source address of the VXLAN data tunnel is the outer destination IP address in the VXLAN encapsulation, and a destination address of the VXLAN data tunnel is the outer source IP address in the VXLAN encapsulation;

if the VXLAN IP gateway does not store the ARP entry, learning an ARP entry comprising the contents;

the processor is further configured to execute the following operations by reading the program:

determine whether the VXLAN IP gateway stores an ARP entry with the following contents:

a VXLAN identifier (VNID) in the VXLAN encapsulation, host information in the ARP packet, and an identifier of a VXLAN data tunnel, wherein a source address of the VXLAN data tunnel is the outer destination IP address in the VXLAN encapsulation, and a destination address of the VXLAN data tunnel is the outer source IP address in the VXLAN encapsulation;

if the VXLAN IP gateway does not store the ARP entry, learning an ARP entry comprising the contents.

7. A packet forwarding apparatus applied to a virtual extensible local area network (VXLAN), wherein, the apparatus is applicable to a first VXLAN tunnel end point (VTEP), comprising:

a memory; and a processor executing the following operations by reading a program from the memory:

establishing a VXLAN data tunnel between the first VTEP and a VXLAN IP gateway group, a source address of the VXLAN data tunnel is a VTEP IP address of the first VTEP, a destination address of the VXLAN data tunnel is a VTEP group IP address of the VXLAN IP gateway group, the VXLAN IP gateway group comprises N VXLAN IP gateways in the VXLAN, wherein N is larger than 1, the VXLAN IP gateways are second VTEPs in the VXLAN, different VXLAN IP gateways have different VTEP IP addresses; and establishing a VXLAN control tunnel between the first VTEP and each of the VXLAN IP gateways in the VXLAN IP gateway group, a source address of the VXLAN control tunnel is the VTEP IP address of the first VTEP, a destination address of the VXLAN control tunnel is a VTEP IP address of each of the VXLAN IP gateways, the VXLAN control tunnel and the VXLAN data tunnel are associated with a same VXLAN identifier; and transmitting an address resolution protocol (ARP) packet respectively via the VXLAN data tunnel and the VXLAN control tunnel.

8. The packet forwarding apparatus of claim 7, wherein the first VTEP comprises N tunnel ports associated with the VXLAN data tunnel;

wherein the processor is further configured to execute the following operations by reading the program:

performing a VXLAN encapsulation to the ARP packet according to the VXLAN data tunnel, select one tunnel port from the N tunnel ports to forward the VXLAN encapsulated ARP packet.

* * * * *